March 19, 1968  W. C. WEHNER  3,374,038
PIVOTAL JOINT
Filed March 23, 1966  2 Sheets-Sheet 1
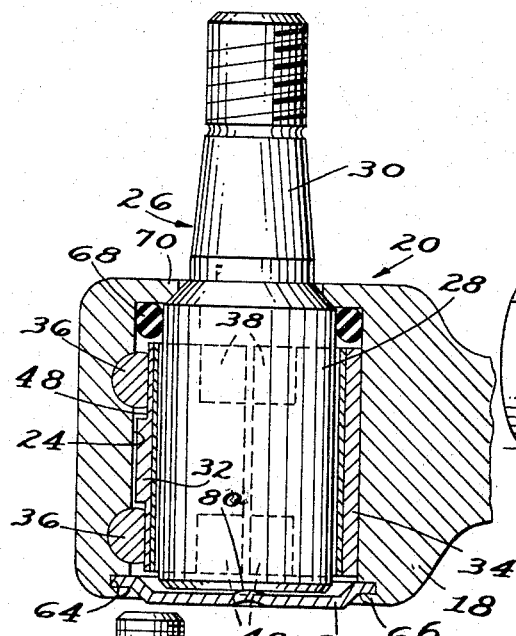
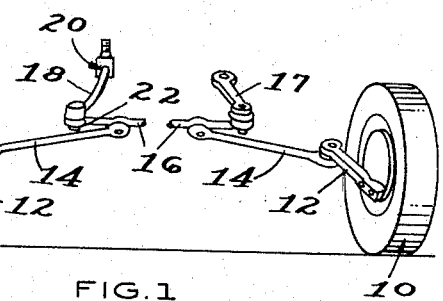
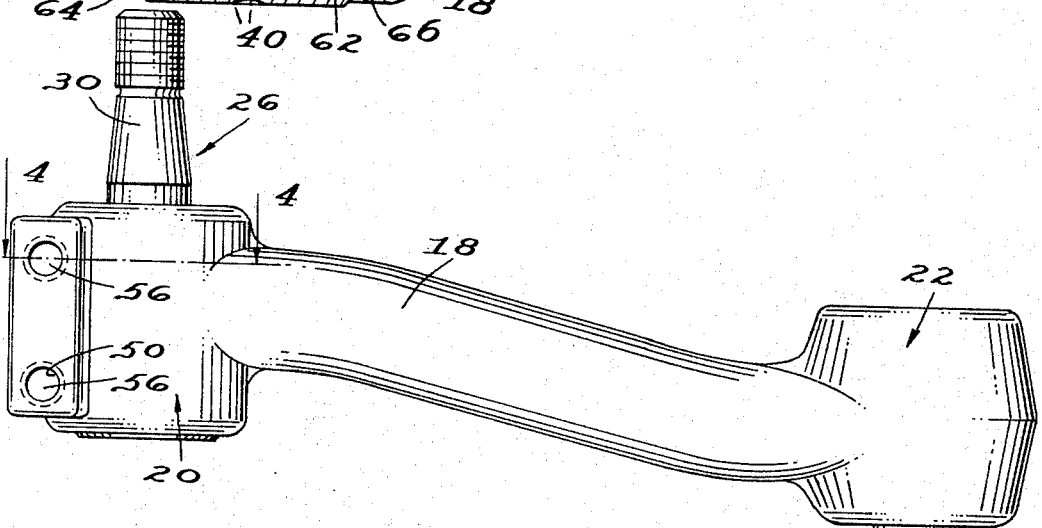
INVENTOR
WILLIAM C. WEHNER
BY
Burton & Parker
ATTORNEYS March 19, 1968 W. C. WEHNER 3,374,038
PIVOTAL JOINT
Filed March 23, 1966 2 Sheets-Sheet 2

*INVENTOR*
WILLIAM C. WEHNER
BY
Burton & Parker
ATTORNEYS

United States Patent Office 3,374,038
Patented Mar. 19, 1968

3,374,038
PIVOTAL JOINT
William C. Wehner, Detroit, Mich., assignor to Moog Industries, Inc., St. Louis, Mo., a corporation of Missouri
Filed Mar. 23, 1966, Ser. No. 536,824
13 Claims. (Cl. 308—66)

This invention relates to improvements in self-adjusting, or wear take-up, pivotal joints. More particularly, this invention relates to pivotal bearing joints, wherein the bearing is continuously adjusted to compensate for wear between the pivotal member and the bearing surfaces. The pivotal joint of this invention has particular, although not exclusive, utility in a steering linkage idler arm, such as used in automotive parallelogram type steering linkages.

In an automotive steering linkage, the motion of the steering wheel is translated through a gear system to a pitman arm, which is secured to one end of a draglink. The opposite end of the draglink is pivotally connected to the automobile frame by an idler arm, the subject of this invention. The motion of the draglink is transmitted through tie rods, etc., to the front wheels of the automobile, whose angulation is to be controlled.

The term "parallelogram type" steering linkage refers to the parallel reaction of the draglink to the motion of the pitman arm, which results from the fact that the idler arm acts as a pivot, and follows the motion of the pitman arm. When, however, the pivotal connection of the idler arm is loose, and able to move independent of the pitman arm, inadequate steering control may result.

Conventional idler arm assemblies are designed with clearances between the pivotal member and the bearing surfaces, or resilient material is employed at the interface, because of the practical impossibility of machining "true" cylindrical or spherical surfaces, especially in mass production. This results in imperfect steering control, which becomes worse as the assembly wears.

Various solutions to this problem have been propoed, including the use of conically configured mating surfaces. These solutions, however, are subject to the same deficiencies, because the mating surfaces will not be accurately aligned, and frictional wear will increase the clearances.

The idler arm assembly of this invention provides an economic solution to these problems. Basically, the idler arm assembly of this invention comprises a pair of annular bearing halves having substantially cylindrical bearing pads, which fully support a pivot shaft, sometimes referred to herein as a cylindrical stud, received therein. The bearing pads are continuously and nonreversibly urged against the stud to maintain zero clearance. The pads are shaped and positioned to provide at least a four-point support for the stud at each end, which has been found to be the minimal support for a rigid assembly.

An object of this invention is therefore to provide an automatically self-adjustable pivot joint which will maintain a zero clearance between the pivotal member and the bearing surfaces, while retaining the requisite freedom of movement, thus eliminating the need for manual adjustment.

Another object of this invention is to provide an automatically adjustable pivot joint which is suitable for use in steering linkage idler arms, such as used in automotive parallelogram type steering linkages, and which eliminates the need for service, and which is comparable in cost to conventional nonadjustable and manually adjustable idler arm assemblies.

Another object of this invention is to provide an idler arm which is interchangeable with conventional idler arm assemblies, wtih an automatically operable take-up unit, and to provide means for hermetically sealing the assembly so that foreign material, including water, is completely excluded from the interior working portions of the unit.

Another object is to provide an idler arm assembly which automatically compensates for misalignment between the stud head and the related bearing surfaces.

Other objects, advantages and meritorious features will more fully appear from the specification, claims and accompanying drawings, wherein:

FIG. 1 is a schematic illustration of an automotive steering linkage;

FIG. 2 is a side elevation of an idler arm assembly;

FIG. 3 is a side cross-sectional view, in the direction of view arrows 3—3 in FIG. 4, of the idler arm assembly of this invention;

Figure 4:
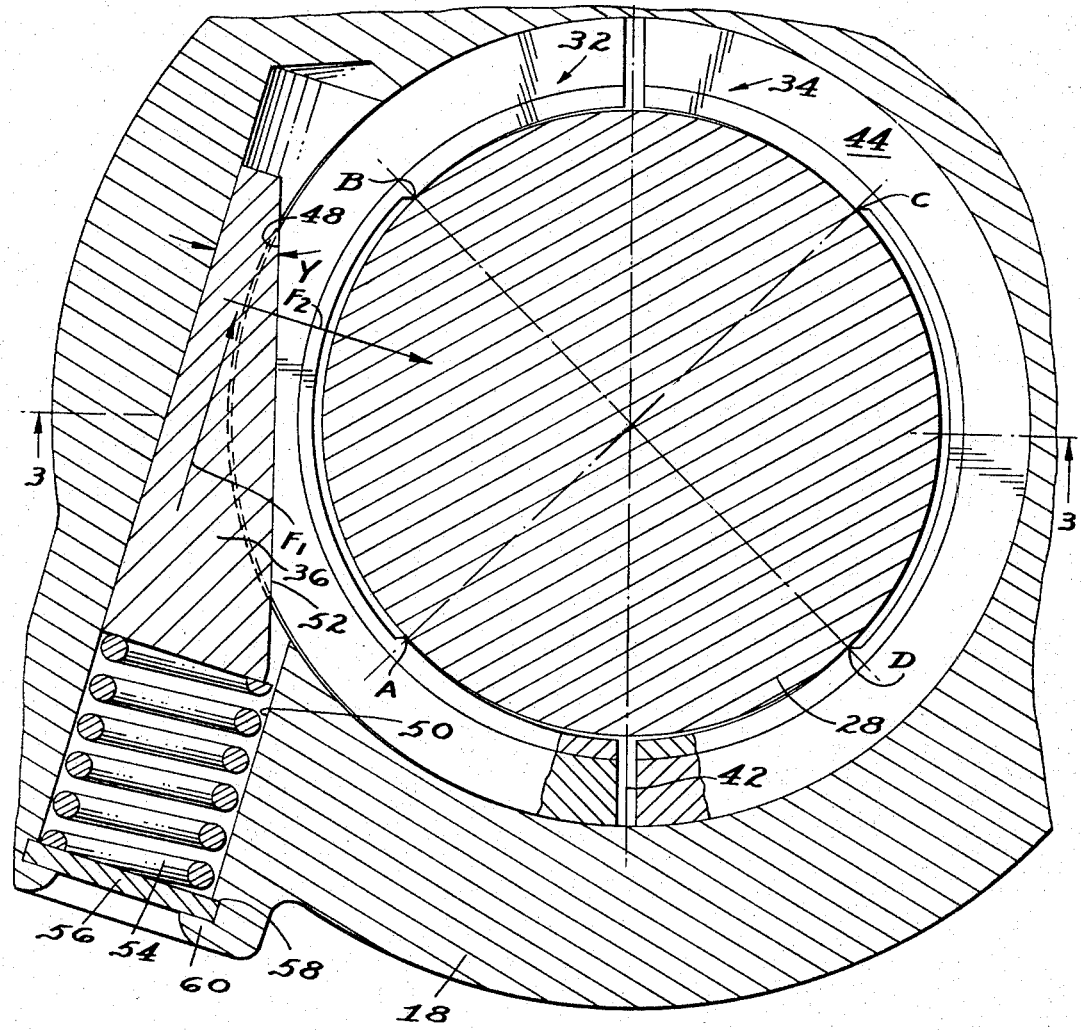
FIG. 4 is a top cross-sectional view in the direction of view arrows 4—4 of FIG. 2.

In FIG. 1, a conventional automotive steering linkage system is shown in simplified form. The front wheels 10 are supported by steering arms 12, which are pivotally connected to a draglink 16 by tie rods 14. The draglink 16 is driveably connected at one end to a pitman arm 17, and is pivotally supported at the other end by the idler arm 18. The pitman arm 17 is operably connected to a steering column through a gear system (not shown). The idler arm 18 is pivotally supported at one end 20 by the automotive frame (not shown), and is pivotally connected at the other end 22 to the draglink 16. The idler arm acts as a follower to the motion of the pitman arm, and supports the draglink end to maintain the steering linkage in proper geometric relationship.

The idler arm assembly is shown in FIG. 2. The idler arm 18 may be formed in any suitable manner, such as by casting, forging, etc. The pivotal joints, 20 and 22, may be identical or different in construction, however the structure of the pivotal joint of this invention will be described in relation to the pivotal joint 20, which connects the idler arm to the automotive frame.

In Figs. 3 to 6 the structure of the pivot joint assembly 20 is shown in detail. The idler arm 18 is provided with a substantially cylindrical open-ended socket 24. A load bearing stud, shown generally at 26, has a polished cylindrical head portion 28 received within the socket, and a shank portion 30 extending out of the socket open end. A pair of annular bearing halves 32 and 34 are disposed about the stud head for bearing support thereof, and a pair of spring-urged wedge members 36 continuously and "nonreversibly" urge the bearing half 32 against the stud head 28, and the stud head against the opposite bearing half 34.

The problem involved in fully supporting the cylindrical head of the stud, is due in large part to its size. A conventional stud head employed in an idler arm assembly is less than an inch in diameter, and approximately an inch and a half in length. Thus, even an accurately machined bearing will allow the stud to shift under loading. Irregularities in the mating surfaces will either act as a fulcrum in a loose joint, or cause galling or locking of the head within the bearing in a more closely aligned joint.

One solution proposed for this problem has been the use of a resilient bearing, however this solution only compounds the problem as a resilient bearing is subject to deterioration, and will yield under shock loading. The bearing halves of this embodiment of my invention provide a four "point" suport for the stud head, at each axial end. Each bearing half has two substantially cylindrical circumaxially aligned pair of bearing pads 38 and 40. The pads are positioned adjacent the parting line 42 (Fig. 4) of the bearing.

It can be seen in Fig. 4 that the diameter of the cylindrical bearing pads is slightly greater than the diameter of the cylindrical stud head, and that the bearing "halves" are less than one-half of an annular bearing of the same diameter. Thus, a four "point" support is provided at A, B, C and D, equally spaced around the circumference of the stud head, and the head is supported by at least two points in any plane.

The bearing pads are axially spaced for the same reason that they are spaced circumaxially. This provides a point support for the stud head at each axial end, which could not be achieved with bearing pads which extended from end to end. This is because of the practical impossibility of machining accurately aligned surfaces.

Figure 5:
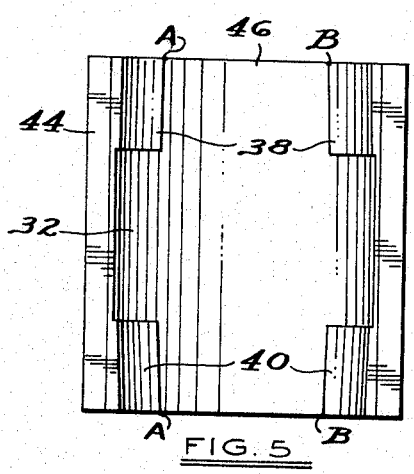
FIG. 5 is a side elevation of a bearing half employed in this invention.
Figure 6:
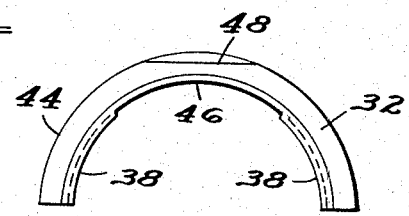
FIG. 6 is a top elevation of the bearing half shown in FIG. 5.

Fig. 5 shows an additional stabilizing feature which may be employed. In Fig. 5 the bearing pads 38 and 40 are shown tapered along their axis toward the midportion of the bearing half 32, and the angle of inclination is slightly exaggerated for clarity. This provides a maximum stability for the stud head by spacing the support points as far as possible, which provides the maximum length versus diameter ratio ($L/D$).

The bearings may be made of any well-known bearing material, but is preferably not resilient for the reasons given hereinabove. A bearing material which has been found especially suitable is a malleable metal, such as lead, copper or bronze. The bearing may also be a composite material, wherein the bearing surface is a malleable metal coating on a bearing insert. Such materials will deform slightly under the force of the wedge means to more accurately conform to the shape of the stud head, and will not yield under instantaneous loading. Another common bearing material is oil impregnated compressed metal alloys. The bearing illustrated in the drawings is a composite bearing, wherein a steel backing 44 has been surfaced with a malleable metal such as lead-copper which forms the lining 46. The pads may be integral with the lining as shown, and they may be formed with the lining, or after, as by coining.

The bearing assembly of this invention is designed to automatically self-adjust for wear, and maintain the stability of the stud head support. The bearing pads are maintained in bearing engagement with the stud head by the continuous urging of the wedge members 36. Initially, the bearing will wear primarily at the support points A, B, C and D. Gradually, the area of the support points will increase, as the pads are deformed or worn to the configuration of the stud head. As the pads wear, the bearing halves are continuously and nonreversibly urged toward each other, into engagement with the stud head, until the entire pad has deformed to the precise configuration of the stud head.

The effectiveness of the bearing assembly is not diminished when full engagement of the bearing pads is reached. A four "point" support is thus maintained, which could not have been duplicated by machining without unreasonable cost. The primary bearing half 32 is secured against rotation by the wedge members 36, and the follower bearing half 34 may be staked or otherwise secured against rotation to prevent wear between the OD of the bearing and the ID of the socket.

An important feature of the illustrated embodiment of my invention is the continuous and "nonreversible" urging of the primary bearing half 32 against the stud head 28. To provide an effective automatically adjustable bearing assembly, a comparatively large uniform reactant force is required, which will not reverse under reverse loading. This result has been achieved in the disclosed embodiment of my invention in a simple, compact, and inexpensive design.

The wedge members 36 are received in apertures 50 in the idler arm 18, which communicate with the joint socket 24. A pair of key slots 48, aligned with the housing apertures 50, are provided in the OD of the primary bearing 32, and receive the wedging face 52 of the wedge members. The wedge members bear against the primary bearing half adjacent its axial ends to provide a substantially uniform reactant force, $F_2$, against a stud head. The primary force, $F_1$, is supplied by coil springs 54, which react against the housing to urge the wedge members against the primary bearing half. The coil springs 54 are seated against a cover 56, which is received in a counterbore 58 and spun in place as shown at 60. The fact that the wedge members are independently shiftable, will allow them to aid in correcting for unequal wear or misalignment between the upper and lower portions of the head.

The comparatively large force asserted by the primary bearing, and the "nonreversible" feature of the wedge means, is substantially the result of the small wedge angle Y of the wedge members, as shown in FIG. 4. The reactant force, $F_2$, which is the force asserted by the primary bearing against the stud head, and the primary force, $F_1$, which is the force asserted by the springs 54 against the wedge members, are related to the wedge angle Y by the following equation:

$$F_1/F_2 = \tan (\text{angle } Y)$$

Thus, if the angle Y is equal to 15 degrees, the reactant force $F_2$ will be equal to approximately four times the spring force $F_1$. And, because there are two independently urged wedge members, the resultant force $F_2$ will be twice the resultant force of one spring. Therefore, I have achieved a comparatively large reactant force with a small spring. I have also found that a small wedge angle, such as 15 degrees, will be "self locking," and therefore reverse loading will not tend to force the wedge members out of the primary bearing slots under anticipated operating conditions.

The wedge members 36 may be made of any suitable material. The wedge members are preferably substantially rigid, and made from a friction-resistant material which will wedgingly shift between the metallic housing and the secondary bearing, which may have a steel backing. Materials which have been found to meet these requirements are brass, aluminum, and plastic. A plastic which has been found suitable is the family of rigid nylon molding compounds, such as molded Du Pont Zytel.

Another meritorious feature of this invention is the elimination of the requirement of a boot, by hermetically sealing the assembly so that foreign material is excluded from the interior working portions of the unit. A cover 62 (FIG. 3) is received in a counterbore 64 in the open end of the socket, opposite the stud shank 30. The counterbore is then spun over at 66 to seal the socket opening. An O-ring 68 is received within the socket and compressed in a chamber defined by a wall of the socket 24, the edge of the bearing, the stud, and an annular flange 70 of the idler arm. The closures 56 (FIGS. 2 and 4) may be made of a soft metal, such as aluminum or copper, to improve the seal of the aperture 50. The interior of the socket 24 is thus hermetically sealed against foreign material, particularly moisture.

Stray axial loading on the idler arm 18 or the automotive frame may cause the idler stud head 28 to shift axially between the cover 62 and the annular flange 70. This axial motion may be prevented by any well known means, such as by providing a resilient or cup-shaped washer between the cover 62 and the stud head 28. A simpler but effective means is provided by the dimple 80 shown in FIG. 3. The dimple is located substantially on the axis of the stud on the inside of the cover 62, and has a thickness slightly greater than the clearance between the inside of the cover and the stud head 28. Thus, the dimple 80 is tensioned against the stud head when the cover is spun in place, and a "zero" axial clearance is maintained during axial loading of the stud head.

Although I have set forth and described my invention with respect to certain details and principles, it will be obvious to those skilled in the art that these may be varied without departing from the purview of the invention as set forth in the appended claims.

What is claimed is:

1. A self-adjusting idler arm assembly, comprising: an idler arm having a socket defined therein, a stud having a substantially cylindrical head received within said socket, a bearing comprising two separate bearing halves disposed about said head within said socket, said bearing halves providing substantially cylindrical bearing pads in bearing engagement with said head forming at least a four-point support for said head said points being initially substantially equally spaced about the circumference of said head, and a wedge means continuously and non-reversibly urging one bearing half against said head and said head against the other bearing half to maintain said four-point support of said stud head.

2. The self-adjusting idler arm assembly defined in claim 1, wherein each of said bearing halves has two circumaxially aligned bearing pads providing said four-point support of said stud head.

3. The self-adjusting idler arm assembly defined in claim 1, wherein each of said bearing halves has two circumaxially aligned bearing pads adjacent the parting center line of said bearing halves, and the resultant force of said wedge means is substantially perpendicular to said parting center line.

4. The self-adjusting idler arm assembly defined in claim 1, wherein each of said bearing halves has two pair of axially spaced circumaxially aligned bearing pads providing a four-point support for said head adjacent each axial end of said annular bearing.

5. A self-adjusting idler arm assembly, comprising: an idler arm having a socket defined therein, a stud having a substantially cylindrical head received within said socket, a bearing comprising separate bearing halves disposed about said head within said socket, said bearing halves providing four circumaxially aligned bearing supports for said substantially cylindrical head in bearing engagement therewith at each axial end of said head, and a wedge means continuously and nonreversibly urging one bearing half against the head and said head against the other bearing half to maintain said support of said head.

6. The self-adjusting bearing assembly defined in claim 5, wherein said wedge means includes a pair of independently urged wedge members which bear against said one bearing half substantially in the plane of said circumaxially aligned supports.

7. An idler arm assembly, comprising: an idler arm having an open ended socket defined therein, a load bearing stud having a substantially cylindrical head received within said socket and a shank portion extending out of the socket open end, a bearing comprising two separate bearing halves disposed about said head within said socket, said bearing halves each having substantially cylindrical bearing pads in bearing engagement with said head forming at least a four-point support for said head said points being initially substantially equally spaced about the circumference of said head, and a socket closure sealingly received over one open end of said socket opposite said shank.

8. The idler arm assembly of claim 5, wherein an O-ring is received within said socket adjacent the shank of the stud hermetically sealing the socket from foreign material.

9. A self-adjusting bearing assembly, comprising in combination: a housing defining a socket therein, a cylindrical load bearing stud received within said socket, an annular floating bearing comprising two separate bearing halves disposed within said socket about said stud, said bearing halves each having at least two substantially cylindrical bearing pads in bearing engagement with said stud, said cylindrical bearing pads of a diameter slightly greater than said cylindrical load bearing stud to provide a predetermined area four-point support for said stud, and a wedge means continuously and nonreversibly urging one bearing half against said stud and said stud against the other bearing half to maintain said four-point support of said stud.

10. The self-adjusting bearing assembly defined in claim 7, wherein each of said bearing halves has two circumaxially aligned pair of bearing pads adjacent the parting center line of said annular bearing in spaced relation adjacent the axial ends of said cylindrical stud.

11. The self-adjusting bearing assembly defined in claim 8, wherein said substantially cylindrical bearing pads are tapered along their axis toward the midportion of said annular bearing to provide a point support for said stud adjacent the axial ends of said annular bearing.

12. The self-adjusting bearing assembly defined in claim 8, wherein said wedge means includes a pair of wedge-shaped members received within a pair of slots in one of said bearing halves, said slots substantially parallel to said parting center line of said annular bearing.

13. The self-adjusting bearing assembly defined in claim 10, wherein the angle of inclination of said wedge-shaped members is self-locking, and said members are each continuously urged by a helical spring reactant against the housing socket.

References Cited

UNITED STATES PATENTS

| | | | |
|---|---|---|---|
| 241,420 | 5/1881 | Richards | 308—66 |
| 1,653,407 | 12/1927 | Ogden | 308—66 |
| 1,807,701 | 6/1931 | Norton | 308—66 |
| 2,239,834 | 4/1941 | Williams | 308—74 |
| 3,096,128 | 7/1963 | Wight | 308—238 X |
| 3,112,123 | 11/1963 | True | 308—238 X |

FOREIGN PATENTS 12,165   6/1896   Great Britain.

FREDERICK L. MATTESON, JR., *Primary Examiner.*

R. A. DUA, *Assistant Examiner.*